Jan. 9, 1968  R. C. MOSELEY  3,363,058
DATA CONVERSION SYSTEM HAVING STORAGE MEANS
Filed Feb. 10, 1964  2 Sheets-Sheet 1
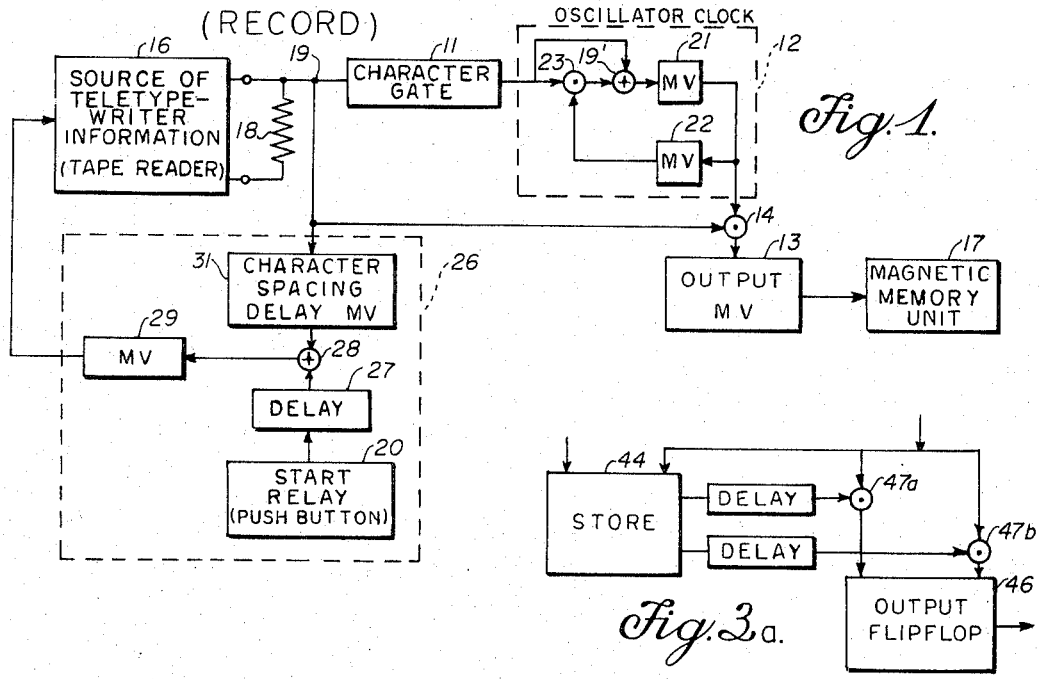
Fig.1.
Fig.3a.
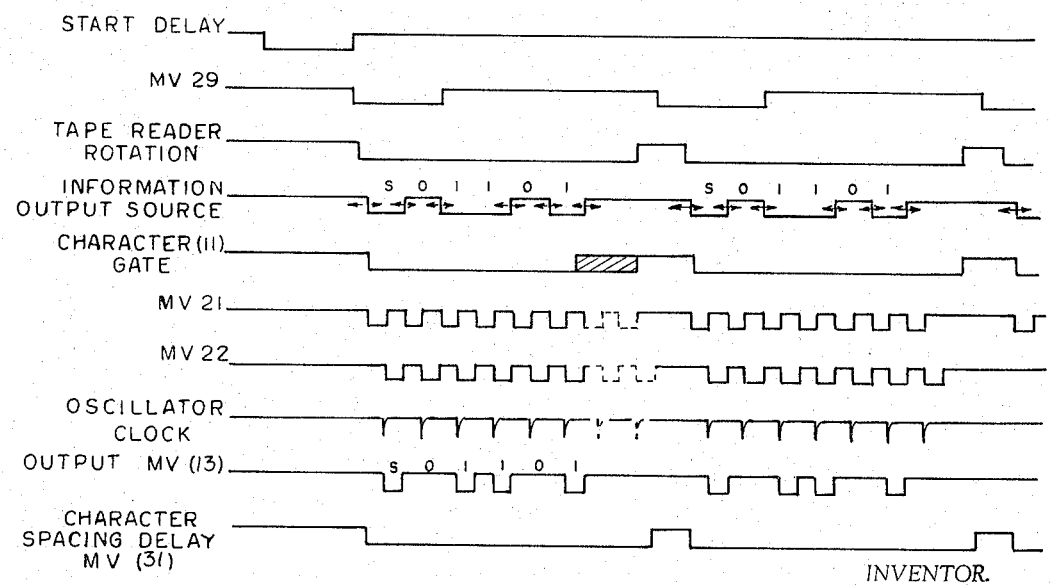
Fig.2.
INVENTOR.
ROBIN C. MOSELEY
BY
ATTORNEYS

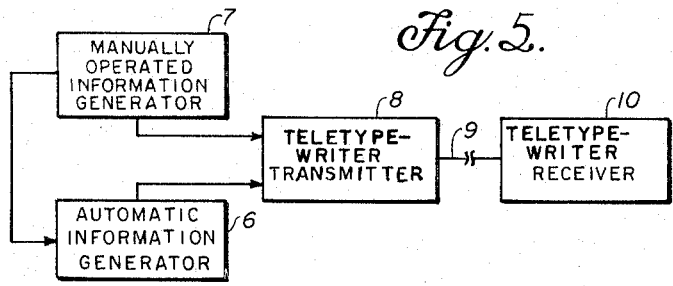
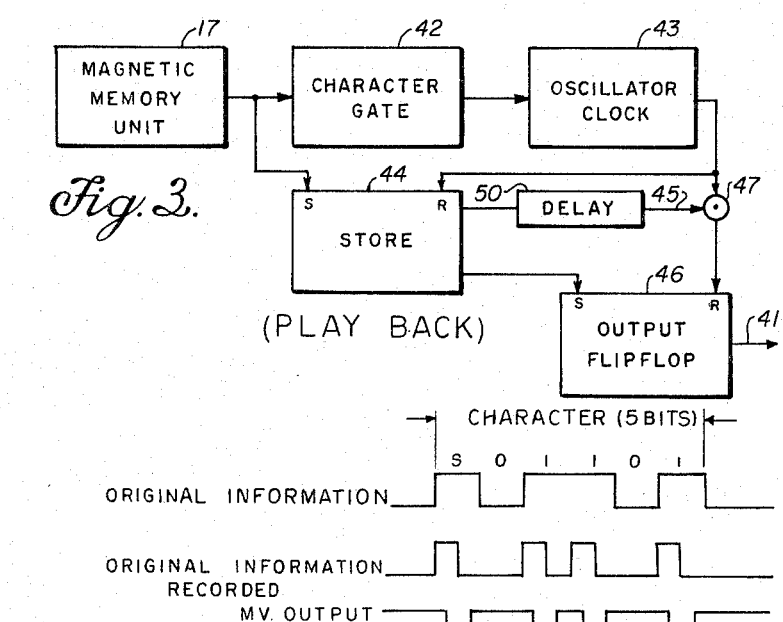

United States Patent Office 3,363,058
Patented Jan. 9, 1968

3,363,058
DATA CONVERSION SYSTEM HAVING
STORAGE MEANS
Robin C. Moseley, San Jose, Calif., assignor to Dasa
Corporation, a corporation of California
Filed Feb. 10, 1964, Ser. No. 343,609
22 Claims. (Cl. 178—17.5)

ABSTRACT OF THE DISCLOSURE

A system for converting pulse information arranged in a teletypewriter code format into a signal format suitable for magnetic recording, and for reconverting the information back into the original format.

The present invention relates to methods and apparatus relating to information transfer devices and more particularly to methods and apparatus for recording and transmitting information in a form similar to that employed in the transmission of information via teletypewriter.

The transmission of information by teletypewriter includes the following steps: generating the information to be transmitted by a trained operator manually working a typewriter-like device; putting the generated information in a particular form which is intelligible to teletypewriter equipment; transmitting the information over a transmission line; receiving the information at the other end of the transmission line; and displaying the information transmitted on paper for visual inspection. The operation outlined above is general in nature and may be deviated from, as by storing the information generated onto paper punch tape until such time as it is desired that the information be transmitted over the transmission line. Likewise, it is possible for the information which is received to be stored for later display at such time as may be convenient. For purposes of the present invention, however, it is important only to note that the transmission of information by teletypewriter requires a manual operation on the part of a skilled technician and further requires that the information be in a particular form when transmitted.

Information which is transmitted by teletypewriter generally includes information of a fixed nature and information which is variable. Information of a fixed nature is that information which is frequently transmitted in the identical form. Information of this type includes addresses of persons to whom information is frequently sent by teletypewriter, often used sentences or paragraphs employed to inform the recipient of the information of the general nature of the subject matter of concern, stock numbers or similar identification numbers, etc. Variable information includes information which is not used repeatedly in the exact same form and which describes particular events or needs which are continually changing. Information of this type includes general information intended to apprise the recipient of conditions existing at the moment, quantities of products which have been identified by stock numbers or other identification numbers, etc.

It is the general aim of the present invention to provide methods and apparatus whereby information of a fixed nature (as defined above) can be stored in a convenient form for fast recall when needed. In operation the present invention provides means whereby a particular portion of the stored information can be quickly selected, and generated automatically at the push of a button. By providing a teletypewriter transmitting station with the ability to automatically generate certain fixed information, it is possible to greatly reduce the time required to transmit a given message, and the chances of error in transmitting this fixed information are practically eliminated. Since the time of transmission and the accuracy of the information transmitted are two important factors in teletypewriter operation, the present invention is capable of making a significant contribution to the efficiency of transmitting information via teletypewriter.

In order to provide the desired functions set out above it is necessary to provide means whereby fixed information can be stored for fast and convenient recall in a device which enables information to be entered, changed or removed. It is, of course, a further requirement that the storage device be of sufficient capacity to enable a significant amount of the fixed information to be retained for recall.

There are presently known and employed in the telephony art devices capable of magnetically storing telephone numbers for fast recall and automatic telephone dialing in response to the push of a button. Such a device is fully set out in the copending patent application of George S. Lockwood et al. for Equipment and Methods for Automatic Electronic Telephone Dialing Ser. No. 249,223 filed Jan. 3, 1963. This patent application describes a device which employs a magnetic memory system into which digital information is entered and from which digital information can be recalled for the purpose of dialing a telephone. The system further is described as having a magnetic tape which records pulses generated from a telephone dial in the form of magnetic pulse patterns. The recorded pulses can later be recreated by passing a transducer over the portion of the magnetic tape containing the pulse pattern. The device described in the aforementioned patent application contains many of the features necessary for an advantageous system for recording and sending telegraph information, i.e. the ability to quickly recall information stored in the system, a large storage capacity, accurate, dependable operation, etc. The basic differences between the form of the information used in telephone systems and telegraph systems, however, prevents the devices which are presently known in the telephony art from being useful in conjunction with telegraph systems as they presently exist.

In order to take advantage of the techniques which have proven successful in the telephony art the present invention provides a system which operates on telegraph information to make it acceptable for storage in an automatic repertory dialer of the type described in the Lockwood et al. patent application referred to above.

The present invention further provides means whereby the information contained in the magnetic memory unit in a non-telegraph form can be employed to transmit a signal over telegraph lines in telegraph form.

Since telephone dialing only requires the use of ten different digits it is possible to employ a simple pulse system whereby each digit is characterized by a train of pulses wherein the number of pulses in each train is equal to the digit which it represents. This is a unitary code system where all information is contained in pulses. Thus, a telephone number starting with the numbers 479 is characterized by a pulse train having four pulses, followed by a pulse train having seven pulses, followed by a pulse train having nine pulses. Each of the pulse trains representing one digit are separated by time intervals referred to as inter-digital time intervals which are greater than the time intervals which exist between the pulses in a digit pulse train. A device, such as that set forth in the Lockwood patent application referred to above, has telephone numbers entered into its magnetic memory unit by dialing a series of pulse trains directly into the automatic dialer. These pulse trains are then recorded on the magnetic media which serves as the memory unit. At some subsequent time when it is desired to automatically dial the telephone number previously entered into the magnetic memory, a transducer head scans the area of the magnetic media on which the telephone number was previously recorded. The output of the transducer is a series of pulse trains substantially identical with the pulse trains which were originally generated when the desired telephone number was entered into the memory unit by dialing. Because of the nature of telephone dialing, automatic telephone dialers are designed to receive and send pulses which are substantially identical and are carefully designed to maintain specified spacing between these identical pulses. These systems, therefore, are basically not designed for, nor capable of recording and transmitting information which is contained in a code system wherein pulse width is an information variable, and information is contained in the absence of pulses as well as pulses (for instance the Baudot code).

A telegraph system must be capable of transmitting letters of the alphabet as well as digits, making it totally impractical to use a pulse train system such as that employed in the telephony art, since this would give rise to pulse trains of unreasonable lengths, and be a most inefficient use of storage space. In order to avoid these undesirable features, telegraph information is transmitted by telegraph characters where each character represents a letter or digit and is comprised of either five or eight bits (depending on whether a five or eight bit character code is being used) plus a start bit. Each bit has a fixed duration so that every character, no matter what letter or digit it represents, also has a fixed duration which is the same as every other character. If the bits employed to form a character are formed by either a pulse, or the absence of a pulse, each character will include a start bit (which is always a pulse) followed by five bits (assuming a five bit code) wherein any of the bits may be either a pulse or the absence of a pulse. Since the telegraph code system does not provide spacing between bits of a character, a character may appear as a pulse six bits wide (this would be a start pulse plus five bits each of which is a pulse) or could be characterized by a single pulse followed by a five bit wide blank space (this would be a character including a start pulse plus five bits all of which are the absence of a pulse). It can be readily seen from the description of the form of the information employed in the telegraph art that equipment must be employed which can distinguish between pulses of different widths, as well as between blank spaces (absence of pulses) of different widths.

While the foregoing discussion has been concerned primarily with distinguishing between telephone systems and telegraph systems, this is not to be taken as indicating a unique situation or relationship. The form of the information employed in various other information transfer devices is equally unacceptable to automatic telephone dialers (e.g. computers). Thus, the present invention in providing means for making information in telegraph form acceptable for use with an automatic telephone dialer applies equally to other information transmission systems where information is characterized in a manner similar to that found in telegraph systems.

Accordingly, it is an object of the present invention to provide methods and apparatus for recording and sending information.

It is a further object of the present invention to provide methods and apparatus for making information in telegraph form acceptable for use in conjunction with automatic repertory telephone dialers as known in the art.

An object of the present invention is to provide a magnetic memory system for storing fixed information which can be rapidly recalled for automatic operation of telegraph systems and the like.

Still another object of the present invention is to provide methods and apparatus for converting information in teletypewriter form into a pulse form which is more readily stored and recalled electronically, as well as means for converting the information so stored into a teletypewriter form.

Further objects and advantages of the present invention will be made apparent in the following specification wherein a preferred form of the invention is described by reference to the accompanying drawings:

In the drawings:

FIG. 1 is a schematic block diagram of the record portion of the present invention;

FIG. 2 is a series of wave forms illustrating the manner in which information is converted from teletypewriter form to a pulse form;

FIG. 3 is a schematic block diagram of the playback system of the present invention;

FIG. 3a is an alternate embodiment of a portion of the system as shown in FIG. 3;

FIG. 4 is a series of wave forms illustrating the manner in which information is converted from a pulse form to teletypewriter form; and FIG. 5 is a block diagram illustrating the present invention complementing a standard teletypewriter system.

Referring to FIG. 5, a manually operated telegraph information generator 7, such as a teletypewriter, directs its output signals to a teletypewriter transmitter 8 which in turn transmits the signal via a telegraph line 9 to a distant teletypewriter receiver 10. The normal procedure in conveying information from a teletypewriter transmitter 8 to a teletypewriter receiver 10 is to manually generate all of the information to be transmitted by means of the manual information generator 7. An alternate mode of operation includes an intermediate step whereby the information generated on the generator 7 is stored temporarily on paper punch tape which can later be used in conjunction with a tape reader to simulate the output of generator 7 and thus provide signals which represent the information to be transmitted.

The present invention adds to the teletypewriter system described above an automatic information generator 6 including a memory unit, which enables certain fixed information to be quickly selected and automatically generated to teletypewriter transmitter 8 or to a paper punch tape. The memory unit in the automatic generator 6 contains fixed information which is frequently employed in the identical form. This information is initially entered into the memory unit by any standard teletypewriter component normally employed to transmit information to teletypewriter transmitter 8, such as manually operated information generator 7. By adding an automatic information generator 6 with a manually operated information generator 7, a significant amount of information can be delivered to the teletypewriter transmitter 8 (or a paper punch tape) automatically and thereby eliminate a significant amount of human error which occurs through use of the manually operated generator 7.

Referring now to FIG. 1, a character gate 11, an oscillator clock 12, an output multivibrator 13 and an AND gate 14 provide a system whereby information in teletypewriter form can be transferred from a source of information 16, such as a teletypewriter or tape reader, to a magnetic memory unit 17. The source of teletypewriter information 16 represents any device which has an output which represents information in the form of characters as employed in the teletypewriter art. Thus, if the output of source 16 is dropped across a resistor 18 the voltage at the juncture point 19 will be one of two values representing the existence of a pulse or the absence of a pulse. The occurrence of a signal at juncture point 19 representing a pulse, operates to open character gate 11 for a length of time approximating the duration of one character. Since each character is comprised of a start bit and five information bits, and further since each bit is of a fixed duration the character gate can be set to open for a period of time which will enable one character to be generated before it closes.

Character gate 11 is advantageously realized as a unistable multivibrator which responds to a pulse signal from source 16 by changing to its unstable state for a specific length of time and then returning to the quiescent condition. Once the character gate 11 is in its unstable state, subsequent pulses received by the gate will have no effect thereon and the gate will return to its quiescent state at the prescribed time. (This is to say that subsequent pulses received by the gate when it is in its unstable condition will not restart the multivibrator cycle.) Since each character in the teletypewriter code begins with a start pulse, the gate 11 will always change to its unstable state in response to teletypewriter information being generated from source 16. When character gate 11 is in its unstable state it is operative to start the oscillator clock 12 running and keep it running as long as the gate is in this unstable condition.

The oscillator clock 12 provides a series of impulses which are evenly spaced and which occur at intervals equal to the duration of one teletypewriter character bit. The impulses from clock 12 are directed to an AND gate 14 through which they pass to the unistable output multivibrator 13 when the appropriate conditions prevail. When output multivibrator 13 receives an impulse, it changes to its unstable state for a fixed duration which must be less than one bit duration and during which an output signal of an essentially constant level is provided. The output from the multivibrator 13 is fed to the magnetic memory unit 17 and recorded on appropriate media contained therein.

The AND gate 14 receives a signal directly from the source 16 as well as from the oscillator clock 12. Only when there is a pulse signal from source 16 to the AND gate 14 can an impulse from clock 12 pass through the gate 14 to the output multivibrator 13.

The oscillator clock 12 may be any device which is capable of providing impulses at fixed duration and which operates only when character gate 11 is in its unstable state. A device which operates in just this manner can be formed by using a pair of multivibrators, an AND gate and an A.C. coupled OR gate. When the character gate 11 responds to a start pulse by changing to its unstable state, a signal is provided which is received by an OR gate 19' and passed to a first multivibrator 21. The multivibrator 21 responds to the signal from the OR gate 19' by running for a specified time less than one bit duration (illustrated in FIG. 2 as one-half of the time duration of one bit). The multivibrator 21 provides a pulse the trailing edge of which is employed to form the impulses which are sent to the AND gate 14. The impulses which the multivibrator 21 is responsible for producing are also directed to a second multivibrator 22.

Multivibrator 22 responds to impulses from multivibrator 21 by running for a time period which together with the time period of multivibrator 21 equals the duration of one character bit. The trailing edge of the pulse formed by multivibrator 22 introduces a signal to an AND gate 23 which together with the signal from the character gate 11 provides a signal which is received by OR gate 19' and directed to the first multivibrator 21. This will start the multivibrator 21 running for another cycle at the end of which an impulse will be delivered to AND gate 14 and multivibrator 22, which will start running once again. Thus, multivibrator 21 energizes multivibrator 22 which turns around and energizes multivibrator 21. By using the trailing edges of the pulses formed by the two multivibrators 21 and 22 and having their combined running time equal to the duration of a single bit, impulses will be received at AND gate 14 at intervals equal to the duration of one bit. When the character gate 11 is in its quiescent state, the AND gate 23 will prevent pulses from multivibrator 22 from passing through to OR gate 19 and thus break the chain of events which maintains the oscillator clock 12 running.

It is necessary to provide between each character in a teletypewriter message a certain amount of pause, or intercharacter time. During this pause time the transmitting machinery is able to reset itself to accept the next character and properly transmit it. If the time between characters is not sufficient to enable the transmitting machine to reset itself properly, the results will be a breakdown of the machinery or an error in the information transmitted. Thus, as the information is stored in magnetic memory unit 17 it is necessary to make sure that a sufficient pause time exists between characters during playback to enable the transmitting machine to operate properly.

If information is generated from the magnetic memory unit 17 at its normal read out rate (the rate which information is normally transmitted over a telegraph line), the spacing between characters which are subsequently generated from the magnetic memory unit 17 may be slightly under the minimum time required to insure the proper inter-character time. In order to insure that a sufficient time will exist between characters when information is retrieved from the magnetic memory unit 17, a system indicated generally at 26 is combined with the recording system set out above to control the time delay between successive characters.

In order to initially start the process of entering information from source 16 into memory unit 17 a manually operated relay device 20, such as a push button, is actuated. The actuation of relay 20 operates to start the components of memory unit 17 into motion, and also actuates delay circuit 27. The delay circuit is operative to postpone the effect of relay 20 on a multivibrator 29 until a certain time (e.g. 200 milliseconds) has elapsed. After the time delay has elapsed, enabling the components of memory 17 to achieve operating speed, a signal is directed to an OR gate 28 which in turn directs a pulse to a multivibrator 29 which energizes a clutch relay (not shown) in source 16 which causes the source to generate one character of information. (Multivibrator 29 must not energize the clutch relay for a time period in excess of one character if single character read out is to be achieved.)

The first pulse (a start pulse) out of source 16 causes a unistable character spacing delay multivibrator 31 to change to its unstable state. The character spacing delay multivibrator 31 will remain in its unstable state for a predetermined period of time which is somewhat greater in length than the time duration of one character plus the minimum delay time between characters. Thus, character spacing delay multivibrator 31 will stay in its unstable state for a specified time after the first pulse (start pulse) has been generated from source 16 and then return to its quiescent state. In returning to its quiescent state, multivibrator 31 initiates a pulse which passes through OR gate 28 to multivibrator 29 which in turn causes a second character to be generated from the source 16. Thus, where the source of information can be controlled to emit a single character at a time, the delay system 26 can be advantageously coupled with the remainder of the record system to insure sufficient spacing between characters.

FIG. 2 illustrates by a number of wave forms the various conditions which exist throughout the system shown in FIG. 1 during various stages of operation. Assuming that the record circuit includes the circuit 26, the first signal which acts on the system when recording is initiated is a manual signal from relay 20 to the delay 27. As shown by the first wave form, actuation of the start relay manifests itself in a pulse (all pulses are shown in FIG. 2 as negative going pulses) having a duration equal to the time required to insure that the moving components of magnetic memory unit 17 have achieved their operating speed. At the end of the start delay pulse, multivibrator 29 receives a signal and induces the source (tape reader) 16 to rotate and generate an output. As seen by the "information source output" wave form, the first signal out of the tape reader is a pulse (negative going) which represents a start pulse. The five bits forming the first character which the tape reader generates are, in their order of occurrence, 01101 where 0 represents the absence of a pulse and 1 represents a pulse. The last 1 (pulse) is followed by an inter-character spacing which is followed by a second character identical to the first character. The start pulse will operate to change the state of the character gate 11. The character gate, as explained above, has a predetermined time period during which it will remain in its unstable state after which it will automatically return to its quiescent state. The shaded area shown in the "character gate" wave form indicates the minimum and maximum time period of the character gate. If the gate returns to the quiescent state prior to the minimum time period, it is possible that the last bit of the character will not be properly recorded, and if it does not return until after the maximum time period, it is possible the system will not properly reset itself before the next character is generated.

The change of state of gate 11 is accompanied by a signal to the multivibrator 21 which causes it to assume its unstable state for a set time period, after which it returns to its quiescent state. The end of the pulse generated by multivibrator 21 (referred to as the trailing edge of the pulse) operates to initiate a similar pulse from multivibrator 22 (see "MV22" wave form) and at the same time generate an impulse which constitutes the oscillator clock output (see "oscillator clock" wave form). The multivibrators 21 and 22 will continue to operate, as previously described, as long as gate 11 remains in its unstable state.

The pulses which are shown in dotted lines indicate optional pulses which may or may not exist depending upon whether or not the minimum, maximum or some intermediate character gate duration is selected. It is to be noted that it is necessary that at least six oscillator clock output pulses be generated since the recording of a bit is in response to an oscillator clock output impulse and each character contains six bits (a start bit plus five character bits).

Each time that the oscillator clock generates an impulse at the same time that a pulse is being generated from the information source, the output multivibrator 13 will receive a signal and respond thereto by generating a pulse having a duration less than the duration of one bit. This pulse will be recorded by the magnetic memory unit 17.

Referring to FIG. 2 and the character therein illustrated, the first oscillator clock impulse occurs after approximately one-half of the start pulse has been generated. Since an impulse is generated by clock 12 while source 16 is generating a pulse, an output pulse is generated from the multivibrator 13. The second impulse from the oscillator clock 12 occurs while no pulse is being generated from the information source and thus no output is realized from multivibrator 13. The second and third bits in the character are both pulses and in teletypewriter information form, combine to produce a pulse two bits wide. Because of the fact that the output multivibrator 13 is designed to run for a duration which is less than the duration of one bit length, two separate pulses will be formed at the output of the multivibrator 13 instead of the single pulse which occurred at the output of source 16. Thus, it can be seen that the pulses which are recorded in the magnetic memory unit 17 are all of substantially identical duration so that it is not necessary for the memory unit and its associated components to distinguish between pulses of various widths.

The last line of FIG. 2 illustrates the character spacing delay multivibrator 31 and illustrates how it changes state immediately upon the start pulse being generated from the source 16 and stays in that state for a time in excess of the duration of one character, after which time it returns to its quiescent state. The trailing edge of the wave form of the spacing delay multivibrator 31 initiates the multivibrator 29 (in place of the manually operated delay 27) which energizes a clutch (not shown) which in turn starts the source operating in order to generate another character. After a short delay (due to certain mechanical operations), the spacing delay multivibrator 31 is again urged to its unstable state by the leading edge of the start pulse of the second character, with the same cycle of events occurring as described.

Since the present invention operates to properly record a bit pulse as long as an oscillator clock impulse occurs within the time period to generate that bit pulse, slight variations or errors in the time of occurrence of the leading and trailing edges of a bit pulse from the information source 16 will not be reflected in the information subsequently stored in the magnetic memory unit 17. Thus, it is altogether possible to have information stored in the magnetic memory unit 17 which is more accurate than the source of that information.

The foregoing description of the record portion of the present invention teaches, with reference to a certain arrangement of components, a method of recording which is independent of the equipment used to practice it. More particularly, the present invention teaches a method for recording information which is represented by electrical signals forming characters comprised of bits of like duration which may be one of two values and between which there is no spacing, wherein the steps include: sampling the information signal at set intervals, where the intervals are preferably equal in duration to the duration of a bit; producing an electrical pulse signal whenever the information signal is sampled and found to be a particular one of the two values; and, recording the pulse signal produced.

While the information as stored in the memory unit 17 is in an acceptable form for reading by the playback head (transducer) of an automatic repertory dialer as known in the telephony art, it is unintelligible to any device used in connection with telegraph systems and thus must be changed in form before it is transmitted. Thus, the foregoing discussion has demonstrated only how to store teletypewriter information in a magnetic memory unit of a repertory dialer as known in the telephony art in a manner acceptable to that device. The following discussion will explain how the information as stored can be employed to transmit intelligible information through a telegraph system.

Referring now to FIGS. 3 and 4, the playback portion of the present invention for retrieving information stored in magnetic memory unit 17 and placing it in an acceptable form on an output line, indicated generally at 41, includes a character gate 42, an oscillator clock 43, a storage flip-flop 44, an output flip-flop 46 and an AND gate 47. Character gate 42 operates in the same manner as character gate 11 described in connection with FIG. 1, and oscillator clock 43 has the same operating characteristics as oscillator clock 12 also previously discussed in connection with FIG. 1. Once again it should be noted that several systems are capable of providing the operating characteristics desired of oscillator clocks 12 and 43 besides that specifically illustrated and discussed in connection with FIG. 1. The function performed by character gates 42 and 11 can also be achieved using known devices other than multivibrators.

The first wave form of FIG. 4 illustrates the original information which was transferred from source 16 to magnetic memory unit 17. The second wave form illustrates the original information as recorded in the magnetic memory unit 17. During the playback cycle, the information in the magnetic memory unit 17 is read by a transducer head (not shown) which in turn drives a multivibrator (not shown), the wave form of which is illustrated in FIG. 4 (the pulses being shown as negative going pulses). The trailing edges of the output pulses from the memory unit multivibrator are employed to generate impulses which form the output signal from the magnetic memory unit 17 to character gate 42 and store 44 (see wave form "output impulses" from memory unit). The first impulse from the magnetic memory unit 17 (representing the character start pulse) operates to put the character gate 42 into its unstable state, and places the store flip-flop 44 in its set condition. The effect of this initial impulse on character gate 42 and store 44 is clearly illustrated by the wave forms of FIG. 4 labeled "character gate" and "store," respectively. Assuming the oscillator clock 43 to have components similar to oscillator clock 12, the operation of the clock is illustrated in FIG. 4 by the wave forms labeled "MV1," "MV2" and "clock output." More important than the manner in which oscillator clock 43 provides its output is the fact that the first clock output impulse occurs after the character gate has been in its unstable state for a duration equal to approximately one-half the duration of a character bit. By so timing the occurrence of impulses from clock 12 and source 17, the store 44 is always assured of being in its set condition before the first impulse from oscillator clock 43 occurs.

The impulses from clock 43, which occur at regular intervals equal to the duration of one character bit, are directed to store 44 and AND gate 47. When the store 44 is in its reset state, it will direct a signal to AND gate 47 via line 45 such that impulses from oscillator clock 43 which occur while the store 44 is in its reset state will be passed through AND gate 47 to the output flip-flop 46. Oscillator clock impulses which pass through gate 47 to flip-flop 46 are operative to condition the output flip-flop 46 to its reset state. Since the initial impulse to occur is from the magnetic memory unit 17 (representing the start pulse bit) which puts the store in its set state, the first impulse from oscillator clock 43 will be directed only to store 44 (AND gate 47 being closed and logical delay 50 preventing an impulse from opening the AND gate for itself) and be effective only to put store 44 in its reset state. Reference to FIG. 4 will show that the initial impulse from the memory unit 17 is operative to place the store in its set condition and maintain it there until such time as the first clock output impulse occurs to put the store back to its reset condition.

Each time that store 44 goes from its set to its reset state, a signal is directed to output flip-flop 46 and this signal is operative to put the output flip-flop in its set state. Once again reference to FIG. 4 will be helpful in visualizing this occurrence specifically by making reference to the wave forms labeled "store" and "output flip-flop."

Since the first bit (of the example character), after the start bit, is a 0, the second impulse from the oscillator clock 43 will occur before a second impulse from magnetic memory unit 17. And since the store 44 is in its reset state, the second impulse from oscillator clock 43 will be able to pass through AND gate 47 and reset the output flip-flop 46.

The second bit of the character is a 1, and therefore gives rise to an impulse from magnetic memory unit 17. This impulse is operative to place the store in its set state such that the subsequent impulse from oscillator clock 44 will be prevented from passing through AND gate 47 and will be operative to reset the store 44 and thereby set the output flip-flop 46. The third bit is also a 1, thus making the next impulse to act on store 44 an impulse from magnetic memory unit 17, operative to place the store in its set state. The subsequent oscillator clock impulse will again be prevented from passing through gate 47 and will be directed to store 44 causing the state of the store to change from set to reset. Changing the state of store 44 from set to reset is normally operative to put the output flip-flop 46 into its set state; the output flip-flop is already in the set state though, so that no change will occur. The effect then of the store 44 receiving alternate memory and clock impulses is an output to line 41 of a pulse, the duration of which is equal to the duration of one character bit times the number of sets of alternate impulses from magnetic memory unit 17 and oscillator clock 43. Since the fourth bit is a 0, two impulses from oscillator clock 43 will be received by store 44 without an intervening impulse from magnetic memory unit 17. This results in the output flip-flop being placed in its reset state in the same manner as described above in connection with the first character after the start bit.

From the foregoing discussion made with reference to FIGS. 3 and 4 it can be seen that the playback portion of the present invention enables the information as stored in the magnetic memory unit 17 to generate an output signal to line 41 which is in teletypewriter form and thus intelligible to teletypewriter components.

It was pointed out in connection with the discussion relating to FIG. 2 that the present invention operates to eliminate rather than perpetuate disortion which might exist in the initiating signal. This same characteristic is present in the playback portion of the invention as well as the record portion. The signal from memory unit 17 initiates from a transducer head passing over a media on which magnetic patterns have been formed. Thus, the output pulses from the multivibrator, which is electrically driven by the transducer head, will vary somewhat from the pulses as recorded such that the output impulses from the memory unit 17 may occur slightly before or slightly after the precise time when they theoretically should occur. This will have the effect of making the precise time when the store 44 will be set relatively unpredictable. Since the only part of the store activity which directly affects the output is the change of state from set to reset, slight variations in the times which the store is set will be of no concern. Since the store is changed from its set to its reset state solely in response to oscilaltor clock impulses, and further since the output flip-flop is changed from its set to its reset state solely in response to oscillator clock impulses, the form of the signal placed on the line 41 is dependent for its accuracy on the oscillator clock 43 which is readily designed to be highly accurate. Thus, the output of this portion of the invention, like that of the record portion, is not directly related to the input in a manner whereby input errors due to distortion are necessarily perpetuated. In general it can be said that both the record and playback systems of the present invention are not affected by time jitter in the initiating signal and will thus be free from errors which might otherwise be caused by such time jitter. The output line 41 from output flip-flop 46 can be attached to any device which is generally driven by a teletypewriter transmitting system. Such devices may include oscillators, frequency shift oscillators, relays, etc.

FIG. 3a is an illustration of an alternate manner of associating the output flip-flop 46 with the store 44. Instead of using a single AND gate 47 a pair of AND gates 47a and 47b are employed with the resulting operation being substantially identical with that described in connection with FIG. 3.

The playback portion of the present invention includes a novel method as well as a novel arrangement of components. The method of playback forms an important part of the invention and is quite independent from the particular components employed to practice it. More particularly, the present invention teaches a method for generating information electrically represented by characters comprised of bits of like duration and one of two values with no spacing therebetween, from stored information which is electrically represented by substantially identical pulses between which some minimum spacing is maintained. The steps which make up the method include; generating an electrical signal representing the store information; sampling the information signal at fixed intervals; and providing a continuous signal at one level when the information signal is sampled and found to be one value, and providing a continuous signal at another level when the information is sampled and found to be another value.

The present invention has been described without making reference to the detailed structure of the various components which form the record and playback systems. This has been done intentionally in order to stress the fact that applicant's invention resides in his method of transforming information from one form to another and the arrangement of components which give rise to the desired transformation. Flip-flop circuits and multivibrators circuits are so well known in the art that a detailed explanation of construction and operating characteristics is believed to be unnecessary. The general operation of teletypewriter systems and automatic repertory dialers as employed in the telephone art are also sufficiently well known to enable them to be referred to in the present invention without requiring a detailed discussion of their operation.

I claim:

1. In a system for recording information electrically represented by characters comprised of bits which are one of two values and between which there is no spacing, into a magnetic memory unit in the form of substantially identical pulses separated by some minimum spacing the combination comprising;
   oscillator clock means operable to provide a series of evenly spaced electrical signals;
   electrical gate means disposed to receive the output signals from said oscillator clock means and the electrical signal representing the information to be stored, said gate means operable to provide an output signal in response to a signal from said oscillator clock means which occurs while the information signal is a particular one of the two possible values; and
   means operable in response to a signal from said gate means to record a pulse into the magnetic memory unit.

2. The recording system of claim 1 further comprising:
   electrical means disposed to receive the signal representing the information to be stored, said means responsive to the initial signal of each character to start said oscillator clock means running and operative to stop said oscillator clock means after each character has been recorded.

3. The system of claim 1 further including means operative to convert said recorded information into the form of bits which are one of two values and between which there is no spacing.

4. In a system for recording information electrically represented by characters comprised of bits which are one of two values and between which there is no spacing, into a magnetic memory unit in the form of substantially identical pulses separated by some minimum spacing, the combination comprising:
   oscillator clock means operable to provide a series of evenly spaced electrical signals;
   electrical gate means disposed to receive the output signals from said oscillator clock means and the electrical signal representing the information to be stored, said gate means operable to provide an output signal in response to a signal from said oscillator clock means which occurs while the information signal is a particular one of the two possible values;
   electrical means disposed to receive the signal representing the information to be stored, said means responsive to the initial signal of each character to start said oscillator clock means running and operative to stop said oscillator clock means after each character has been recorded;
   means storing the information to be recorded and responsive to an initiating signal to direct an electrical signal representing one information character to said electrical means;
   character spacing means operative to direct an initiating signal to said means storing the information to be recorded at intervals in excess of the duration of one information character plus the normal inter-character spacing which exists when the information is transmitted; and
   means operable in response to a signal from said gate means to record a pulse into the magnetic memory unit.

5. The recording system of claim 4 wherein said character spacing means is a multivibrator having a running time approximately equal to the desired initiating signal intervals.

6. The system of claim 4 further including means operative to convert said recorded information into the form of bits which are one of two values and between which there is no spacing.

7. In a system for recording information electrically represented by characters comprised of bits which are one of two values and between which there is no spacing, into a magnetic memory unit in the form of substantially identical pulses separated by some minimum spacing, the combination comprising:
   oscillator clock means operable to provide a series of evenly spaced electrical signals;
   electrical gate means disposed to receive the output signals from said oscillator clock means and the electrical signal representing the information to be stored, said gate means operable to provide an output signal in response to a signal from said oscillator clock means which occurs while the information signal is a particular one of the two possible values;
   electrical means disposed to receive the signal representing the information to be stored, said means responsive to the initial signal of each character to start said oscillator clock means running and operative to stop said oscillator clock means after each character has been recorded;
   means storing the information to be recorded and responsive to an initiating signal to direct an electrical signal representing one information character to said electrical means;
   a character spacing multivibrator disposed to receive the output signal from the information source and respond to start bits by changing to its unstable state for a fixed period of time and then stopping; and
   means responsive to the change of said character spacing multivibrator from a stable state to an unstable state to direct an initiating signal to said means storing said information wherein the total time between the receipt by said character spacing multivibrator of a start bit and an initiating signal being directed to said means storing the information character plus the normal inter-character spacing which exists during transmission of the information.

8. The recording system of claim 7 further comprising:
   an OR gate electrically disposed between said character spacing multivibrator and said means storing the information to be recorded;
   a manually operable initiating signal generator disposed to direct its output to said OR gate whereby a recording can be initially started.

9. In a system for recording information electrically represented by characters comprised of bits which are one of two values and of like duration with no spacing between bits, each character having an initial start bit which is always a particular one of the two values, into a magnetic memory unit where information is electrically represented by substantially identical pulses which are separated from one another by some minimum spacing, comprising in combination;
   oscillator clock means operable to provide a series of electrical signals which are spaced from one another by a duration equal to the duration of one character bit, electrical gate means disposed to receive the electrical signals from said oscillator clock means, said gate means further disposed to receive the signal representing the information to be stored, said gate means responsive to an oscillator clock means signal which occurs while said information signal is a particular one of the two possible values to provide an output signal; and means responsive to an output signal of said gate means to form an electrical pulse the duration of which is less than the duration of a character bit.

10. The recording system of claim 9 further comprising;

electrical means disposed to receive the signal representing the information to be recorded and responsive to start bits thereof to start said oscillator clock means and operative to stop said oscillator clock means after each character has been recorded.

11. The recording system of claim 10 wherein said oscillator clock means provides its first output signal after the information start bit signal occurs and before the information start bit has passed.

12. In a system for generating information electrically represented by characters comprised of bits which are one of two values and between which no spacing exists, from magnetically stored information electrically represented by substantially identical pulses between which a minimum spacing is maintained, the combination comprising:

oscillator clock means operable to provide a series of evenly spaced electrical signals;

electrical store means disposed to receive an electrical signal representing stored information, and also disposed to receive the evenly spaced electrical signals from said oscillator clock means, said store means responsive to a signal from said oscillator clock means immediately following receipt by said store means of a pulse signal representing stored information to provide an output signal; and electrical output signals forming means disposed to receive output signals from said store means and output signals from said oscillator clock, said signal forming means being operable to provide an output at one value in response to a signal from said store means, and a signal of a different value in response to a signal from said oscillator clock means, said signal forming means only receiving a signal from said oscillator clock means when two oscillator clock means signals are provided with no timewise intervening pulse representing stored information.

13. The information generating system of claim 12 further comprising;

electrical character gate means disposed to receive the electrical signals representing stored information and responsive to the first pulse of each character to start said oscillator clock means operating and operable to stop said oscillator clock means after a character has been generated.

14. In a system for generating teletypewriter information which is electrically represented by characters comprised of bits which are of like duration and one of two values with no spacing therebetween, from magnetically stored information electrically represented by substantially identical pulses between which there is a minimum spacing, the combination comprising;

a character gate multivibrator disposed to receive a signal representing the stored information and responsive to the initial pulse of each character to provide a signal for a fixed duration which is in excess of the duration of one character;

oscillator clock means disposed to receive the signal provided by said character gate multivibrator and responsive thereto to provide a series of evenly spaced electrical impulses the time between which is approximately equal to the duration of one bit;

a store flip-flop having a set state and a reset state disposed to receive the impulses from said oscillator clock means and responsive thereto to assume its reset state;

an output flip-flop having a set state and a reset state electrically associated with said store flip-flop and responsive to said store flip-flop changing from its set state to its reset state to assume its set state, said output flip-flop also electrically associated with said oscillator clock means and disposed to receive an impulse from said oscillator clock whenever an impulse is provided and said flip-flop is in its reset state, said output flip-flop responsive to impulses from said oscillator clock means to assume its reset state; and means providing a signal of one value when said output flip-flop is in its set state and a signal of a different value when said output flip-flop is in its reset state.

15. A system for generating informaion represented by pulses which are one of two values and between which there is no spacing, from magnetically stored information represented by substantially identical pulses separted by a predetermined spacing, said system comprising:

a source of clock pulses occurring at evenly spaced intervals;

first means operative to alternately receive stored pulses and clock pulses and to produce gating pulses each commencing upon receipt of a stored pulse and ending upon receipt of a clock pulse; and gating means operative to receive said gating pulses and said clock pulses and to produce output pulses each commencing upon the end of the received gating pulse and stopping upon receipt of a clock pulse.

16. A system for generating information represented by bits which are one of two values and between which there is no spacing, from information represented by substantially identical pulses separated by a predetermined spacing, said system comprising:

clock means for providing timing pulses regularly spaced at intervals substantially equal to the duration of an information bit; and logic circuitry operative in response to said information pulses and said timing pulses to produce in response to adjacent information pulses which are of different value an output pulse of one bit duration, and to produce in response to the number of adjacent information pulses having the same value an output pulse of multiple bit duration related to the number of adjacent information pulses which are of the same value.

17. A system for recording information represented by signal pulses which are one of two values and between which there is no spacing, into a magnetic memory unit in the form of substantially identical bit pulses separated by a predetermined spacing, said system comprising:

a source of clock pulses occurring at evenly spaced intervals equal to the duration of a bit;

gate circuitry operative to receive said signal pulses and said clock pulses and to produce an output pulse each time a clock pulse occurs in predetermined timed relation with the occurrence of a signal pulse of a predetermined one of said two values; and a magnetic memory unit operative to record the output pulses from said gate.

18. The system of claim 17 further including gating means operative in response to the initial one of said signal pulses to energize said source of clock pulses and operative to deenergize said source of clock pulses after said information has been recorded.

19. A system for recording information represented by signal pulses which are one of two values and between which there is no spacing, into a magnetic memory unit in the form of substantially identical bit pulses separated by a predetermined spacing, said system comprising:
   a source of clock pulses occurring at evenly spaced intervals equal to the duration of a bit;
   gate circuitry operative to receive said signal pulses and said clock pulses and to produce an output pulse each time a clock pulse occurs in time coincidence with the occurrence of a signal pulse of a predetermined one of said two values; and
   a magnetic memory unit operative to record the output pulses from said gate.

20. A system for converting binary information signals arranged in a teletypewriter code format into a signal format suitable for magnetic recording, said system comprising:
   clock means for providing timing signals evenly spaced at intervals related to the duration of an information signal; and
   gate circuitry operative to receive said information signals and said timing signals and to produce in response thereto an output signal each time a timing signal occurs in time coincidence with the occurrence of an information signal of predetermined binary value.

21. A system for converting binary information pulses arranged in a teletypewriter code format into a signal format suitable for magnetic recording, said system comprising:
   clock means for providing timing pulses evenly spaced at intervals substantially equal to the duration of an information pulse; and
   gate circuitry operative to receive said information pulses and said timing pulses and to produce in response thereto an output signal each time a timing pulse occurs in time coincidence with the occurrence of an information pulse of predetermined binary value.

22. A system for converting binary information signals arranged in a teletypewriter code format into a signal format suitable for magnetic recording, and for reconverting the information so recorded into teletypewriter code format, said system comprising:
   clock means for providing timing pulses evenly spaced at intervals substantially equal to the duration of an information signal;
   gate circuitry operative to receive said information signals and said timing pulses and to produce in response thereto an output signal each time a timing pulse occurs in time coincidence with the occurrence of an information signal of a predetermined binary value;
   magnetic recording means for storing the information represented by said output signal;
   first gate means operative to alternately receive output signals representing said stored information and timing pulses and to produce gating pulses each commencing upon receipt of an output signal and ending upon receipt of a timing pulse; and
   second gate means operative to receive said gating pulses and said timing pulses and to produce output pulses each commencing upon the end of a received gating pulse and stopping upon receipt of a timing pulse.

References Cited
UNITED STATES PATENTS

| | | | |
|---|---|---|---|
| 2,357,297 | 9/1944 | Wack et al. | 178—2 |
| 2,997,541 | 8/1961 | Grottrup | 178—26.5 |
| 3,059,048 | 10/1962 | Lamin et al. | 178—17.5 |
| 3,149,203 | 9/1964 | Haigh et al. | 178—26 |

THOMAS A. ROBINSON, *Primary Examiner.*